United States Patent
Pulaski

(10) Patent No.: US 6,218,625 B1
(45) Date of Patent: Apr. 17, 2001

(54) GROMMET

(75) Inventor: Joseph R. Pulaski, Ypsilanti, MI (US)

(73) Assignee: Lear Automotive Dearborn, Inc., Southfield, MI (US)

( * ) Notice: Subject to any disclaimer, the term of this patent is extended or adjusted under 35 U.S.C. 154(b) by 0 days.

(21) Appl. No.: 09/165,614

(22) Filed: Oct. 2, 1998

(51) Int. Cl.[7] ................................................. H01B 17/58
(52) U.S. Cl. ........................................ 174/153 G; 248/56
(58) Field of Search .......................... 174/152 R, 152 G, 174/153 G, 153 R, 65 G, 71 R, 72 A, 72 R, 155, 156, 77 R

(56) References Cited

U.S. PATENT DOCUMENTS

| | | | |
|---|---|---|---|
| 684,736 | * | 10/1901 | Wurts ................................. 174/152 R |
| 826,916 | * | 7/1906 | Bartley ................................. 174/155 |
| 2,024,862 | * | 12/1935 | Hooley ................................. 174/65 G |
| 2,225,472 | * | 12/1940 | Franklin ................................. 174/65 G |
| 2,517,693 | * | 8/1950 | Mead et al. ............................ 174/152 R |
| 2,846,246 | * | 8/1958 | Peras ................................... 174/152 R |
| 3,506,999 | * | 4/1970 | Neher ................................... 174/152 G |
| 3,755,615 | * | 8/1973 | Paullus et al. ............................ 174/76 |
| 3,916,086 | * | 10/1975 | Gillemot et al. .......................... 174/93 |
| 4,301,325 | * | 11/1981 | Hutchison ................................ 174/76 |
| 4,500,151 | * | 2/1985 | Ayers ................................. 174/77 R |
| 4,622,436 | * | 11/1986 | Kinnan ................................. 174/77 R |
| 4,647,716 | * | 3/1987 | Akiyama et al. ..................... 174/77 R |
| 4,912,287 | | 3/1990 | Ono et al. ........................... 174/153 G |
| 5,258,578 | * | 11/1993 | Smith et al. ......................... 174/77 R |
| 5,280,138 | * | 1/1994 | Preston et al. ..................... 174/152 G |
| 5,403,977 | * | 4/1995 | Steptoe et al. ...................... 174/77 R |
| 5,406,032 | * | 4/1995 | Clayton et al. ..................... 174/65 G |
| 5,442,141 | * | 8/1995 | Gretz ................................. 174/152 G |
| 5,545,854 | | 8/1996 | Ishida ............................... 174/153 G |
| 5,635,678 | * | 6/1997 | Yasukuni ........................... 174/152 G |
| 5,639,993 | * | 6/1997 | Ideno et al. ........................ 174/153 G |
| 5,834,694 | * | 11/1998 | Bakker et al. ..................... 174/152 G |
| 6,010,134 | * | 1/2000 | Katoh ............................... 174/152 G |

* cited by examiner

Primary Examiner—Dean A. Reichard
Assistant Examiner—Adolfo Nino
(74) Attorney, Agent, or Firm—MacMillan, Sobanski & Todd, LLC

(57) ABSTRACT

A wire harness grommet assembly which is assembled by connecting together a rigid outer member to compress a resilient inner member around a portion of the wire harness accommodated therein. The resilient inner member provides a sealing surface between the rigid outer member and the wire harness. Accordingly, the resilient inner member is compressed when sandwiched between the locked together rigid outer members. Preferably, the rigid outer member is a two piece assembly comprising two identical rigid outer members having integrally molded connectors which allow the grommet assembly to be "snapped" together around the harness.

17 Claims, 2 Drawing Sheets

GROMMET

BACKGROUND OF THE INVENTION

The present invention relates to a grommet for a wire harness having a resilient inner member which seals and secures a wire harness within a rigid outer member.

A wire harness is commonly formed by bundling a plurality of electrical wires together prior to installation into the body of a vehicle. A wire harness connects one or more electrical components within the vehicle and therefore must be routed through various vehicle partition panels. A tight seal is often required between the partition panel and the harness to prevent leakage of liquid or fumes between compartments of the vehicle. It is further desirable to provide support for the harness relative to the panel through which it passes to prevent abrasion. Thus, it is commonly know to provide a grommet to protect and seal the harness where it passes through the partition panels.

Conventional grommets are formed of an elastic rubber to seal the harness to the partition opening. The rubber grommets are commonly installed by forcibly stretching the grommet to thereby allow axial insertion of the harness. When released the rubber grommet conforms to the harness which is then located within the vehicle partition. However, the stretching and locating operations require substantial effort to insert the harness. Further, if the harness is pulled with some force, the rubber grommet will likely be removed from the partition opening due to the grommet's elasticity.

Other known grommets combine a rigid support with an elastic member to improve retention and protection of the harness within the partition opening. However, due to their complex configurations, known combination grommets provide a less effective seal than the grommet described above and are relatively difficult and costly to manufacture and install.

SUMMARY OF THE INVENTION

This present invention provides a unique wire harness grommet that avoids the problems of the prior art described above. The wire harness grommet of the present invention provides an improved grommet assembly which is assembled in a simple and precise manner to provide an effective seal which can be located along any portion of a wire harness by simply "snapping" it in place.

In general terms, the present invention is a wire harness grommet which is assembled by connecting together a rigid outer member to compress a resilient inner member around a portion of the wire harness accommodated therein.

The rigid outer member is essentially a shell held together by mechanical connectors to contain and compress the resilient inner member into a conformable relationship with the wire harness. This prevents the grommet from being easily removed from the vehicle partition panel when the wires are forcibly pulled. Preferably, the rigid outer member is a two piece assembly comprising generally two identical halves having integrally molded connectors which "snap" together.

The resilient inner member provides the sealing surface between the rigid outer member and the wire harness. The resilient inner member is affixed directly to the rigid outer member and located in a cavity defined by the rigid outer member. Preferably, the resilient inner member is an adhesively backed foam pad which is affixed to and compressed by, the rigid outer members.

Alternatively, the cavity is filled with an adhesive prior to the rigid outer member being connected around the harness.

A suitable material for the resilient inner member is a silicon rubber which cures and forms a highly effective seal around the harness.

BRIEF DESCRIPTION OF THE DRAWINGS

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
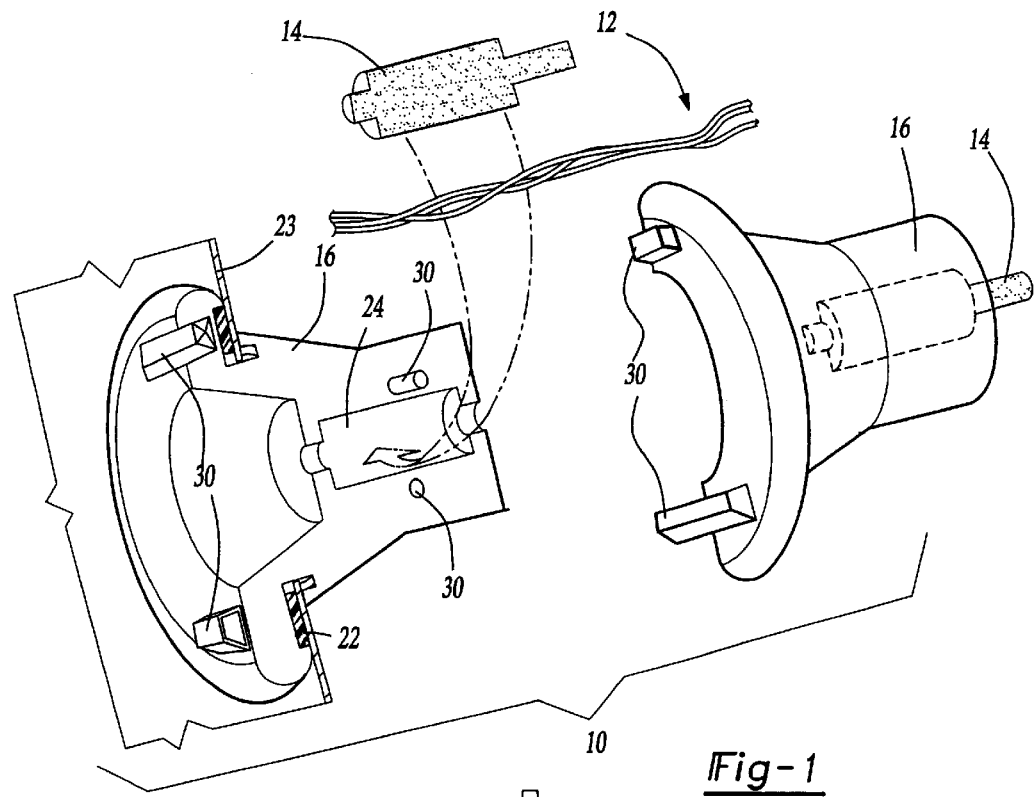
FIG. 1 is an exploded perspective illustration of a grommet assembly according to the present invention.

FIG. 1 illustrates a grommet assembly 10 according to the present invention prior to assembly over a wire harness 12. The grommet 10 includes a resilient inner member 14 which accommodates and seals a portion of the wire harness 12 within a rigid outer member 16. The rigid outer member is here shown as two separate, diametrically mated halves. The rigid outer member 16 is thus shown as a first and a second rigid outer member containing a resilient inner member 14 provided as a first and a second resilient inner member respectively. The rigid outer members 16 are preferably generally identical to prevent mismatching of parts and to minimize the tooling required to produce the grommet assembly 10.

Figure 2:
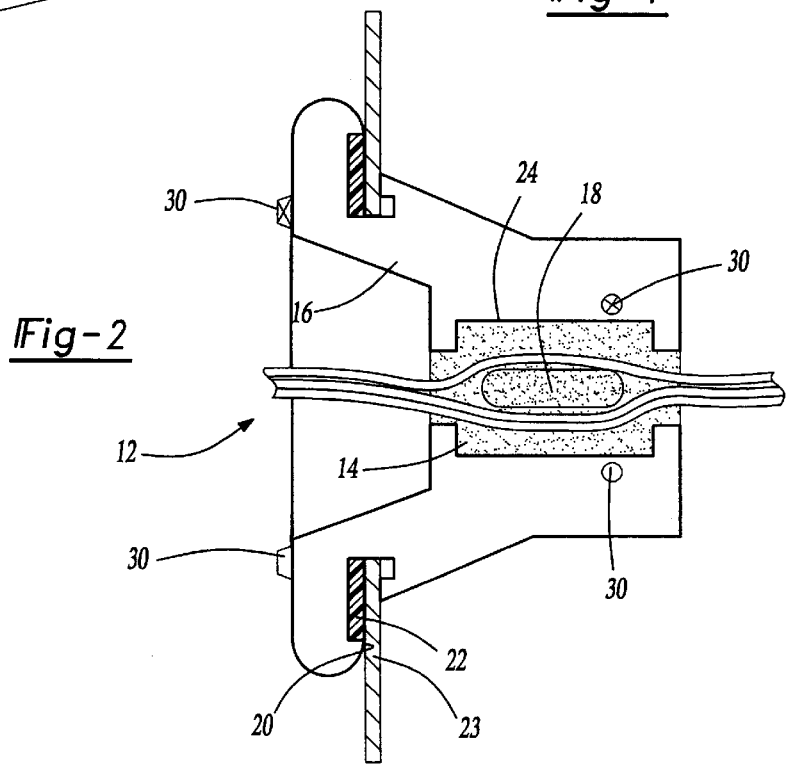
FIG. 2 is a side view of a rigid outer member of the grommet assembly shown in FIG. 1 receiving an alternate inner resilient member having a divider.

The rigid outer member 16 of the grommet assembly 10 is shown in FIG. 2. The rigid outer member 16 provides structural support for the harness 12 when inserted into a panel opening. A mechanical retainer 20 is preferably integrally molded to the rigid outer member 16 to lock the grommet assembly 10 in the panel opening. A seal 22, such as a rubber washer or O-ring, can be located between the retainer 20 and the partition panel 23 to seal the grommet assembly 10 and further prevent leakage of fumes or liquids. Therefore, once mated, the rigid outer members 16, retainer 20, and seal 22 provide an effective sealing interface between the panel 23 and the harness 12.

The resilient inner member 14 is substantially surrounded or contained by the rigid outer member 16 to provide a liquid resistant boundary which easily conforms to the shape of any harness 12 contained therein. The resilient inner member 14 can be set within a cavity 24 of the rigid outer members 16 or can be directly affixed thereto. Preferably, the resilient inner member 14 is an adhesively backed closed cell foam pad which is directly affixed to the rigid outer member 16 providing an effective yet simple to manufacture seal.

The resilient inner members 14 can further include a divider 18 projecting substantially perpendicular to the axis of each resilient inner member 14. The divider 18 is positioned between the wires of the wiring harness 12 (FIG. 2) to provide further retention of the grommet assembly 10 in a specific position on the wire harness 12. The divider 18 therefore contacts the opposing divider 18 and is compressed within the rigid outer members 16.

To allow effective compression and sealing, the resilient inner members 14 extend from the cavity 24 in the rigid outer members 16. Thus, when the rigid outer members 16 are mated, the resilient inner members 14 are compressed to conform around the harness 12 shape to form a tight seal therebetween. When the grommet assembly 10 is installed in the partition opening the radial compression of the resilient inner member 14 is further increased and thereby maintains the highly effective seal.

The individual rigid outer members 16 are attached to each other by connectors 30, which are preferably integrally molded to the rigid outer members 16 in male and female configurations. The connectors 30 thereby allow the rigid outer members 16 to be simply "snapped" together to form the complete grommet assembly 10. By providing each rigid outer member 16 with a female and a male connector the parts can be identically produced to thereby prevent the mismatching of parts and the minimization of duplicative tooling.

Figure 3:
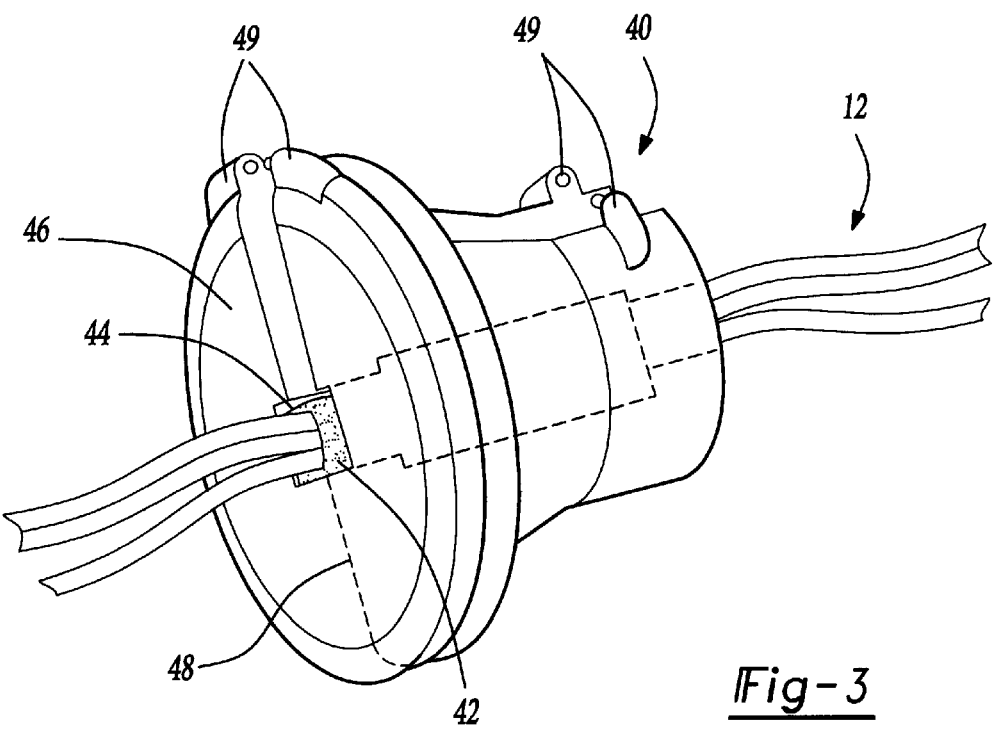
FIG. 3 is a perspective illustration of an alternate grommet assembly according to the present invention.

FIG. 3 illustrates an alternate embodiment of the grommet assembly 40 of the present invention. The cavity 44 defined by the rigid outer member 46 is used to contain the foam pad (FIG. 1) or can be filled with an adhesive material. One skilled in the art will realize that various thermosetting or thermoplastic adhesive materials can be used to form the resilient inner member 42. In this alternate embodiment, an adhesive such as silicon is used as the resilient inner member 42. The cavity 44 is filled with adhesive either before or after the harness is inserted between the rigid outer member 46. Preferably, the adhesive material is injected into the cavity and the harness 12 is placed into the adhesive. The rigid outer member 46 is then connected together around the harness 12 and the adhesive is allowed to cure within. The adhesive thus provides an effective vapor resistant seal between the rigid outer member 46 and the harness 12.

The grommet assembly 40 is substantially similar to the embodiment described above, but the first and second rigid outer members 46 are formed as a single unit. The rigid outer member 46 preferably includes an integral hinge 48 providing a location where the rigid outer member 46 is spread apart. The integral hinge 48 can be of any known configuration which allows opening of the one-piece rigid outer member 46 to provide placement of the harness 12 into the cavity 44.

In the embodiment illustrated by FIG. 3, the rigid outer member 46 is substantially C-shaped in cross section to define the cavity 44. The one-piece C-like shape thus provides a cavity 44 which is highly effective in containing the adhesive while still in a liquid or semi-liquid state. The rigid outer member 46 is spread open along the hinge 48, adhesive is injected into the cavity 44 and the harness 12 is placed within the adhesive. The grommet assembly 40 is then locked closed with the connectors 49, the adhesive cures, and the harness 12 is sealed and protected within the cured adhesive and rigid outer member 46.

Figure 4:
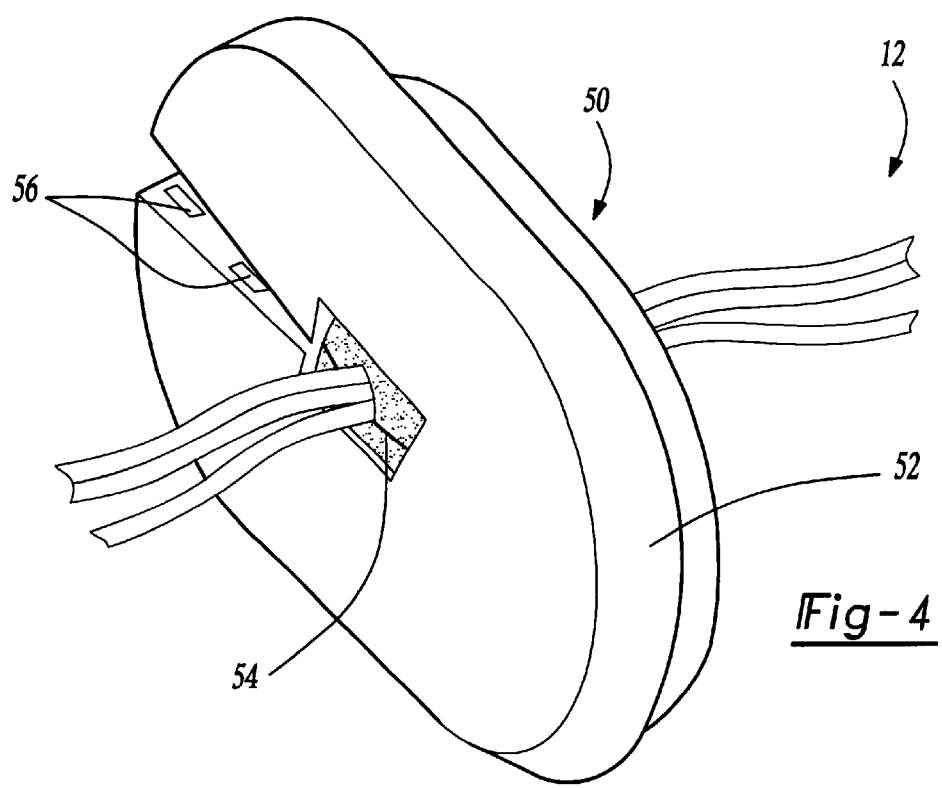
FIG. 4 is a perspective illustration of another alternate grommet assembly according to the present invention.

FIG. 4 illustrates another alternate embodiment of the grommet assembly 50 of the present invention. The grommet assembly 50 is substantially similar to the embodiments described above, but the rigid outer member 52 is formed as a substantially plate-like configuration. This configuration provides an effective yet substantially planar sealing surface where a harness 12 is passed through, for example only, thin sheet metal. In this embodiment the planar rigid outer member 52 is twisted open to accommodate the wire harness 12 within the resilient inner members 54 and is then locked closed by the connectors 56.

The foregoing description is exemplary rather than limiting in nature. Obviously, many modifications and variations of the present invention are possible in light of the above teachings. It is, therefore, to be understood that within the scope of the appended claims the invention may be practiced otherwise than as specifically described.

What is claimed is:

1. A grommet for a wire harness comprising:
    a resilient inner member, the resilient inner member having a first member and a second member, wherein each of the first and second members is formed as a pad and is adhesively backed;
    a rigid outer member substantially surrounding said resilient inner member; and
    a connector disposed on said rigid outer member, said connector securing said rigid outer member around the wire harness, said rigid outer member compressing said resilient inner member.

2. The grommet according to claim 1, wherein said rigid outer member is formed as a pair of members secured together by said connector.

3. The grommet according to claim 2, wherein said pair of rigid outer members are coupled by a hinge.

4. The grommet according to claim 2, wherein said pair of rigid outer members are identical.

5. The grommet according to claim 1, wherein said resilient inner member is disposed within a cavity of said rigid outer member.

6. The grommet according to claim 1, wherein said rigid outer member is substantially C-shaped in cross section, said rigid outer member secured together by said connector.

7. The grommet according to claim 1, wherein each of said first and second members is a closed cell foam pad.

8. The grommet according to claim 1 wherein each of the pads includes a divider projecting substantially perpendicular to a longitudinal axis of the pad.

9. The grommet according to claim 1, further comprising a retainer for mounting said grommet to a surface.

10. The grommet according to claim 9, wherein said retainer includes a seal member located between said rigid outer member and the surface.

11. A wire harness assembly comprising:
    a wire harness;
    a grommet having a resilient inner member formed as two adhesively backed pads for accommodating a portion of said wire harness;
    a rigid outer member substantially containing said resilient inner member; and
    a connector disposed on said rigid outer member, said connector securing said rigid outer member around said wire harness, said rigid outer member compressing said resilient inner member to seal said wire harness therein.

12. The grommet according to claim 11, wherein said rigid outer member includes a pair of members secured together by said connector, said wire harness being accommodated therebetween.

13. The grommet according to claim 11, wherein said rigid outer member is substantially C-shaped in cross section having a cavity, said pads are accommodated within said cavity.

14. The grommet according to claim 11, further comprising a retainer for mounting said grommet to a surface.

15. The wire harness assembly according to claim 11 wherein each of the pads includes a divider projecting substantially perpendicular to a longitudinal axis of the pad.

16. A grommet comprising:
    an inner resilient member formed as first and second pads;
    a rigid outer member formed as first and second members, each of the first and second members includes a cavity for receiving respective said pads, each of the pads being coated with an adhesive prior to insertion into respective said cavity; and a connector formed on the rigid outer member for securing the first and second members together as the first and second pads are compressed together.

17. The grommet according to claim 16 wherein each of the pads includes a divider projecting substantially perpendicular to a longitudinal axis of the pad.

* * * * *